(12) United States Patent
Feller et al.

(10) Patent No.: US 7,333,701 B1
(45) Date of Patent: Feb. 19, 2008

(54) NEUTRON DETECTION

(75) Inventors: W. Bruce Feller, Tolland, CT (US); Paul L. White, Sturbridge, MA (US); P. Brian White, Palmer, MA (US); R. Gregory Downing, Niskayuna, NY (US)

(73) Assignee: Nova Scientific, Inc., Sturbridge, MA (US)

( * ) Notice: Subject to any disclaimer, the term of this patent is extended or adjusted under 35 U.S.C. 154(b) by 0 days.

(21) Appl. No.: 11/522,855

(22) Filed: Sep. 18, 2006

(51) Int. Cl.
*G02B 6/02* (2006.01)
*G01T 3/06* (2006.01)

(52) U.S. Cl. .................. 385/123; 385/115; 385/125; 385/128; 250/390.11

(58) Field of Classification Search ............. None
See application file for complete search history.

(56) References Cited

U.S. PATENT DOCUMENTS 4,031,423 A  6/1977 Siegmund

2003/0104738 A1* 6/2003 Porter ............ 442/134
2003/0178574 A1* 9/2003 Wallace et al. ...... 250/390.11
2005/0265678 A1* 12/2005 Manyam et al. ......... 385/127

* cited by examiner

Primary Examiner—Tina M. Wong
(74) Attorney, Agent, or Firm—Fish & Richardson P.C.

(57) ABSTRACT

An apparatus including a microchannel plate having a structure that defines multiple microchannels. The structure includes multiple claddings that form the walls of the microchannels, each of the claddings including a semiconducting layer. The claddings are surrounded by a glass having a lower percentage of materials having atomic numbers higher than 34 as compared to the cladding. The glass has a higher percentage of neutron absorbing material than the cladding, the neutron absorbing material capable of capturing neutrons in reactions that result in secondary electron emissions in the microchannels.

37 Claims, 9 Drawing Sheets

NEUTRON DETECTION

BACKGROUND

This invention relates to neutron detection.

Neutron-sensitive microchannel plates (MCP) can be used to detect special nuclear materials (SNM), such as plutonium, or can be used in neutron imaging. A microchannel plate can be formed by bonding a glass plate between an input electrode and an output electrode, and providing a high voltage direct current (DC) field between the electrodes. The glass plate is perforated with a substantially regular, parallel array of microscopic channels, e.g., cylindrical and hollow channels. Each channel, which can serve as an independent electron multiplier, has an inner wall surface formed of a semi-conductive and electron emissive layer.

The glass plate can be doped with, e.g., boron-10, which can capture neutrons in reactions that generate lithium-7 and alpha particles. As the lithium-7 and alpha particles enter nearby channels and collide against the wall surfaces to produce secondary electrons, a cascade of electrons can be formed as the secondary electrons accelerate along the channels (due to the DC field), and collide against the wall surfaces farther along the channels, thereby increasing the number of secondary electrons. The electron cascades develop along the channels and are amplified into detectable signals that are electronically registered and processed to construct a digital image. The resultant intensity map or image corresponds to the variation in neutron flux striking the microchannel plates surface. Contrast differences within the image of a sample can be used to infer physical and chemical properties.

SUMMARY

In one aspect, in general, a method includes fabricating a channel plate using a plurality of fibers each including a soluble core, a first layer of glass cladding surrounding the soluble core, and a second layer of glass cladding surrounding the first layer of glass cladding, the first layer of glass cladding containing a higher percentage of lead than the second layer of glass cladding, the second layer of cladding containing a higher percentage of at least one of boron-10, lithium-6, and gadolinium than the first layer of glass cladding, and removing the soluble core to form channels.

Implementations of the method may include one or more of the following features. The second layer of glass cladding has less than 1 mol % of lead. Fabricating the channel plate includes drawing the fibers to reduce the cross sectional areas of the fibers. Each of at least some of the channels has a diameter less than 150 microns. The method includes exposing the first layer of glass cladding to hydrogen at a high temperature.

In another aspect, in general, a method includes fabricating a microchannel plate using a plurality of fibers each including a soluble core, a first layer of cladding surrounding the soluble core, and a second layer of cladding surrounding the first layer of cladding, the first layer of cladding having a higher percentage of material having atomic numbers greater than 34 as compared to the second layer of cladding, the second layer of cladding having a higher percentage of neutron absorbing material than the first layer of cladding, and removing the soluble core to form microchannels.

Implementations of the method may include one or more of the following features. Fabricating the channel plate includes drawing the fibers to reduce the cross sectional areas of the fibers. Each of at least some of the channels has a diameter less than 150 microns. The second layer of cladding includes glass having less than 1 mol % of lead. The neutron absorbing material includes at least one of boron-10, lithium-6, and gadolinium.

In another aspect, in general, a method includes applying a bias voltage to a microchannel plate includes a structure that defines a plurality of microchannels, the structure including a plurality of claddings that form the walls of the microchannels, the claddings having a semiconducting layer, the claddings being surrounded by a glass having a lower percentage of lead than the claddings, the glass having a higher percentage of neutron absorbing material than the cladding. The method includes capturing neutrons in the glass and generating secondary electron emissions in the microchannels, and detecting the secondary electron emissions.

Implementations of the method may include one or more of the following features. The neutron absorbing material includes at least one of boron-10, lithium-6, and gadolinium. The method includes generating an image of an object based on detection of neutrons by the microchannel plate. The method includes detecting a nuclear material based on detection of neutrons by the microchannel plate.

In another aspect, in general, a method includes laminating layers of fibers, each fiber including a core surrounded by a cladding, the cladding having a higher percentage of at least one of boron-10, lithium-6, and gadolinium than the core, coating a first conducting layer on a first surface of the laminated layers of fiber, and coating a second conducting layer on a second surface of the laminated layers of fiber.

Implementations of the method may include one or more of the following features. The core of at least some of the fibers has less than 0.1 mol % of boron-10, lithium-6, and gadolinium. Laminating layers of fibers includes orienting a first layer of fibers substantially parallel to a first direction and orienting a second layer of fibers substantially parallel to a second direction, the first direction being at an angle to the second direction.

In another aspect, in general, a method includes applying a bias voltage to a laminate includes layers of fibers, each fiber including a core surrounded by a cladding, the cladding having a higher percentage of at least one of boron-10, lithium-6, and gadolinium as compared to the core, capturing neutrons using the boron-10, lithium-6, or gadolinium in the cladding and generating secondary electron emissions, and detecting the secondary electron emissions.

In another aspect, in general, an apparatus includes a microchannel plate includes a structure that defines a plurality of microchannels, the structure including a plurality of claddings that form the walls of the microchannels, each of the claddings includes a semiconducting layer, the claddings being surrounded by a glass, the glass having a lower percentage of material having atomic numbers higher than 34 as compared to the claddings, the glass having a higher percentage of neutron absorbing material than the cladding, the neutron absorbing material capable of capturing neutrons in reactions that result in secondary electron emissions in the microchannels.

Implementations of the method may include one or more of the following features. The claddings includes at least 10 mol % of lead. Each of at least some of the microchannels has a diameter less than 150 microns. Each of at least some of the microchannels has a length that is at least 10 times the diameter of the microchannel. Each of at least some of the microchannels has at least one of a circular, a square, a rectangular, and a hexagonal cross section. The apparatus includes a shield to reduce the amount of gamma rays reaching the microchannel plate. The apparatus includes an image sensor to detect the secondary electron emissions. The apparatus includes a counter to count the number of detected neutrons.

In another aspect, in general, an apparatus includes a microchannel plate having a structure that defines a plurality of microchannels, the structure including inner claddings each forming the wall of one of the microchannels, each inner cladding being surrounded by an outer cladding having a lower percentage of lead than the inner cladding, the outer cladding having a higher percentage of at least one of boron-10, lithium-6, and gadolinium than the inner cladding.

Implementations of the method may include one or more of the following features. The claddings include at least 10 mol % of lead. The glass material includes at least 1 mol % of at least one of boron-10, lithium-6, and gadolinium. Some of the outer claddings associated with different microchannels are fused together into a continuous piece of material.

In another aspect, in general, an apparatus includes a laminate having layers of fibers, each fiber including a core surrounded by a cladding, the cladding having a higher percentage of at least one of boron-10, lithium-6, and gadolinium as compared to the core. A first conducting layer is coated on a first surface of the laminate, and a second conducting layer is coated on a second surface of the laminate.

Implementations of the method may include one or more of the following features. The core of each of at least some of the fibers includes a glass that has less than 0.1 mol % of boron-10, lithium-6, and gadolinium. The cladding of each of at least some of the fibers includes a glass that has more than 1 mol % of at least one of boron-10, lithium-6, and gadolinium. In some examples, the cladding in each of at least some of the fibers has a thickness in a range between 1 to 10 microns. In some examples, the cladding in each of at least some of the fibers has a thickness in a range between 2 to 5 microns. The laminate includes a first layer of fibers that are parallel to a first direction and a second layer of fibers that are parallel to a second direction, the first direction being at an angle to the second direction. In each layer of fiber, the fibers are spaced apart by distances in a range between 100 to 300 microns.

Other features and advantages of the invention are apparent from the following description, and from the claims.

DESCRIPTION

Figure 1:
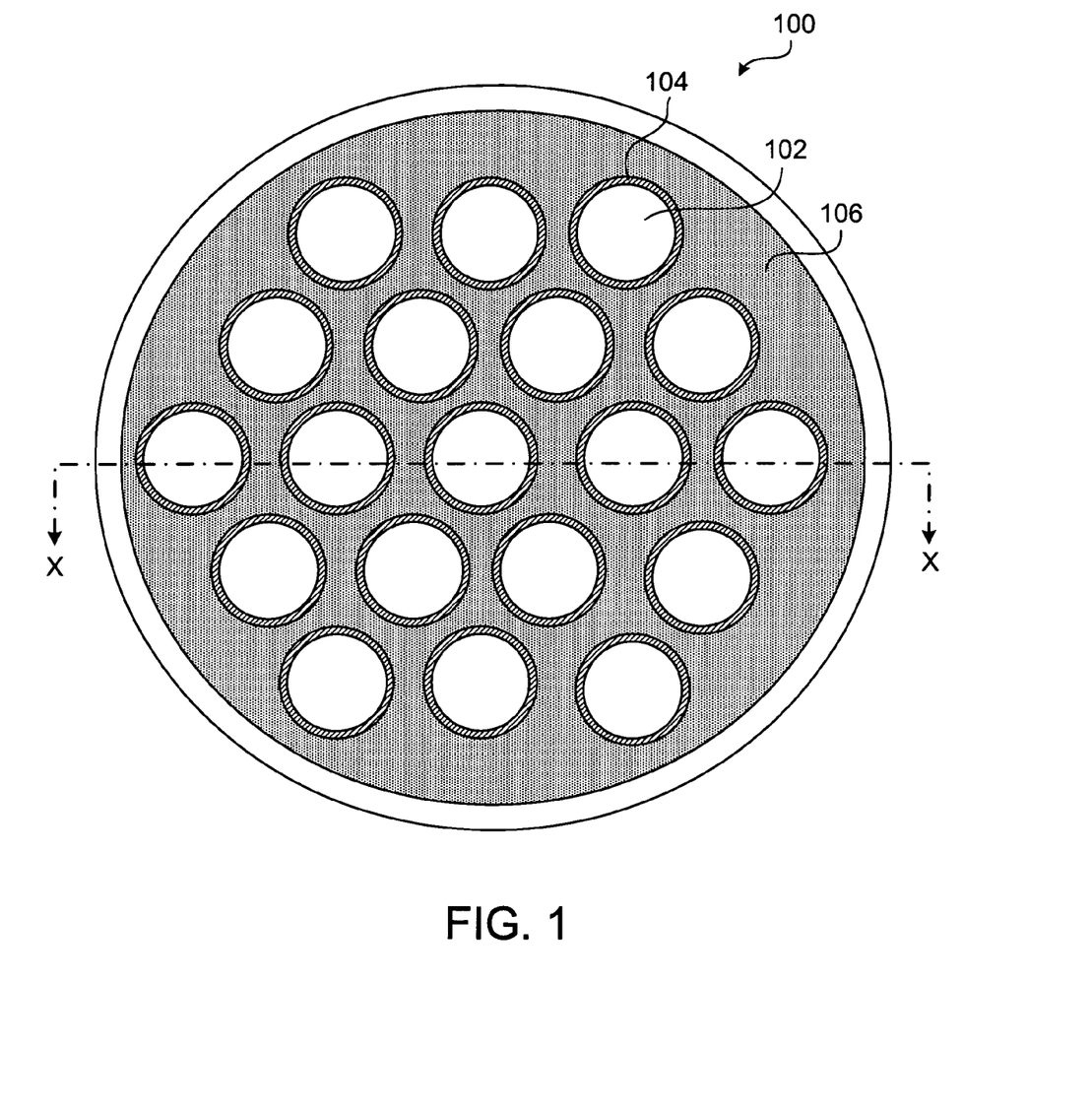
FIGS. 1 and 2 are cross sectional diagrams of a microchannel plate.

FIG. 1 is a cross sectional diagram of an example of a microchannel plate 100 that has a high neutron sensitivity (e.g., greater than 10%) and a low gamma ray sensitivity (e.g., lower than 0.5%). The microchannel plate 100 has an array of microscopic channels 102 each having a diameter of about, e.g., 5 to 10 microns (μm). Each channel 102 is surrounded by a thin inner cladding 104 having a thickness of, e.g., 1 micron. The inner claddings 104 have high lead content (e.g., having more than 10 mol % lead) and are treated to have semiconductive and electron emissive properties. Each of the inner claddings 104 is surrounded by an outer cladding 106 that includes boron-10 doped glass that has low lead (Pb) content (e.g., having less than 0.01 mol % lead). In the example of FIG. 1, the outer claddings 106 associated with the different microchannels 102 have been fused together into a continuous piece of glass. The boron-10 in the outer cladding 106 enables the microchannel plate 100 to have a relatively high sensitivity to neutrons, while the low lead content in the outer cladding 106 enables the microchannel plate 100 to have a relatively low sensitivity to gamma rays.

Figure 9:
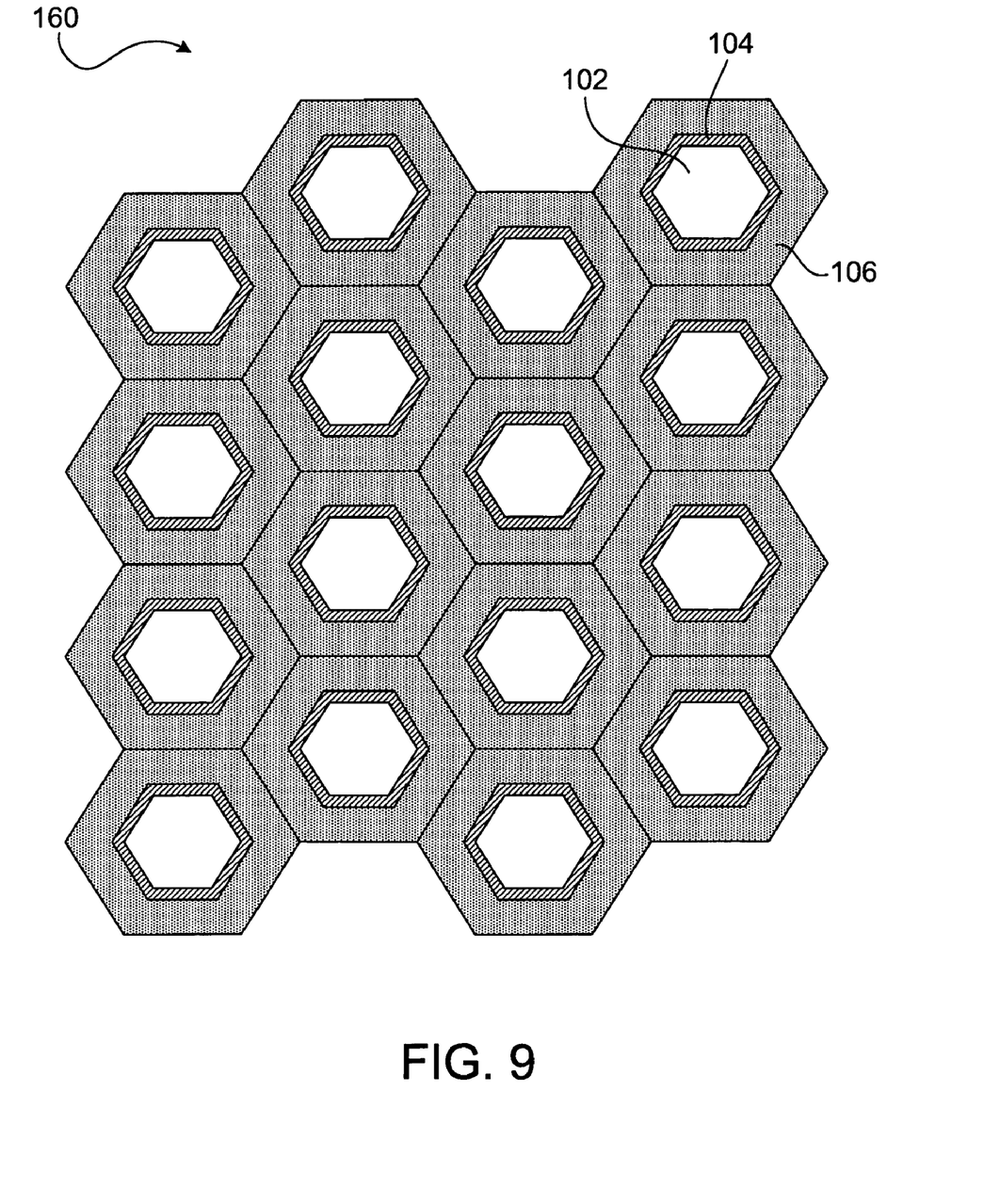
FIG. 9 is a cross sectional diagram of a portion of a microchannel plate.

In the example of FIG. 1, each channel 102 has a circular cross sectional shape. The channels 102 can also have other cross sectional shapes, such as square, rectangle, or hexagon. FIG. 9 is a diagram of a portion of a microchannel plate 160 having microchannels 102 with hexagonal cross sectional shapes. Each microchannel 102 is surrounded by an inner cladding 104, which in turn is surrounded by an outer cladding 106. In the example of FIG. 9, the outer claddings 106 associated with different microchannels 102 are not completely fused together. Due to the semiconductive and electron emissive properties of the inner cladding 104, each channel 102 can serve as an independent electron multiplier, as explained below.

More specifically, the boron-10 atoms in the outer cladding 106 can capture neutrons in reactions that generate alpha particles ($^4$He) and lithium-7 ions, as shown in the reaction below:

$$n + {}^{10}B \rightarrow {}^{7}Li + {}^{4}He + Q,$$

where Q is the energy released in the reaction. The lithium-7 and helium-4 particles pass out of the outer cladding 106 and enter adjacent microchannels 102, freeing electrons along the way.

The microchannel plate 100 is connected to a DC bias voltage to generate an electric field in each microchannel 102 to attract electrons toward the end of the microchannel 102 having a higher electric potential. As the electrons bounce against the channel walls, more electrons are released. From a single neutron, thousands of electrons emerge from the microchannel plate 100. The electrons can be electronically captured as a detection signal or allowed to strike a phosphor screen for imaging.

The outer cladding 106 has low lead content, enabling the microchannel plate 100 to have a low sensitivity to gamma rays. When glass contains lead, the lead can interact with gamma rays to produce photoelectrons that result in cascades of electrons in the channels. This may cause false detection of neutrons because it is unclear whether a detection signal received from the microchannel plate 100 is caused by a neutron or a gamma ray. Thus, it is advantageous to reduce the sensitivity of the microchannel plate 100 to gamma rays during neutron detection.

By reducing the lead content in the outer cladding 106, the amount of photoelectron production due to interaction between lead and gamma rays can be reduced, thereby reducing the sensitivity of the microchannel plate 100 to gamma rays. The inner cladding 104 has a high lead content to provide a semiconducting and electron emissive layer to facilitate electron multiplication in the microchannels 102.

Because the inner cladding 104 is thin, the probably of gamma rays interacting with the lead in the inner cladding 104 is low.

Reducing the sensitivity of the microchannel plate 100 to gamma rays can increase the signal-to-noise (S/N) ratio of neutron detection, leading to higher contrast radiography and detection of smaller features using neutron imaging. The insensitivity of the microchannel plate 100 to gamma rays also allows lower level detection of clandestine nuclear materials, such as plutonium.

Figure 2:
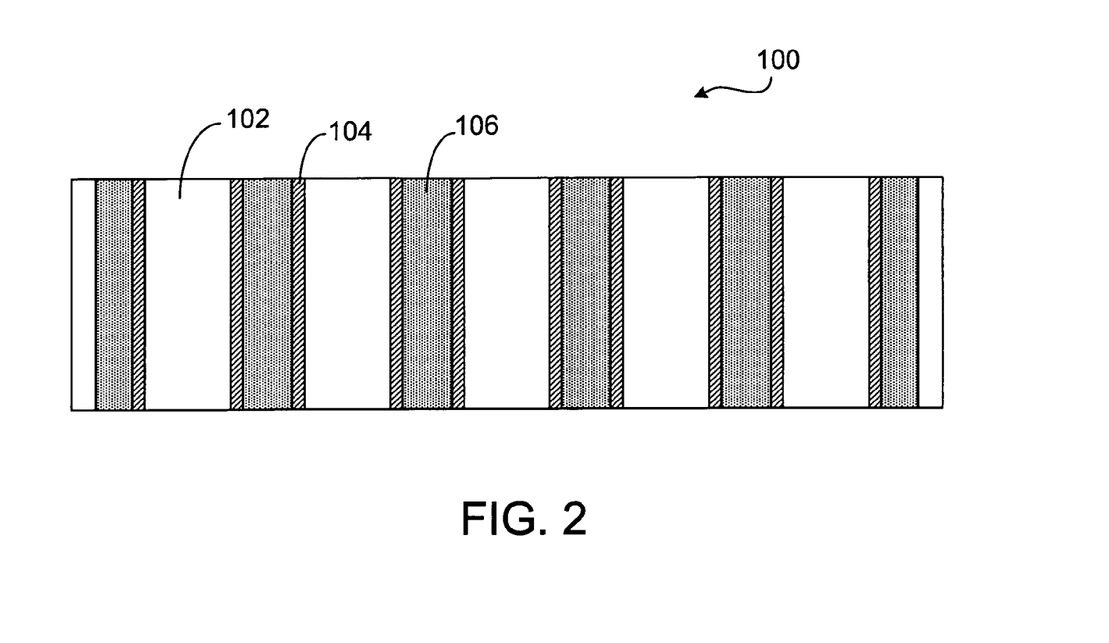

FIG. 2 is a cross sectional diagram of the microchannel plate 100 along the x-x direction shown in FIG. 1. The total volume of the inner claddings 104 is relatively small compared to the volume of the outer cladding 106 so the probability of gamma rays interacting with lead in the inner claddings 104 is small.

Figure 3:
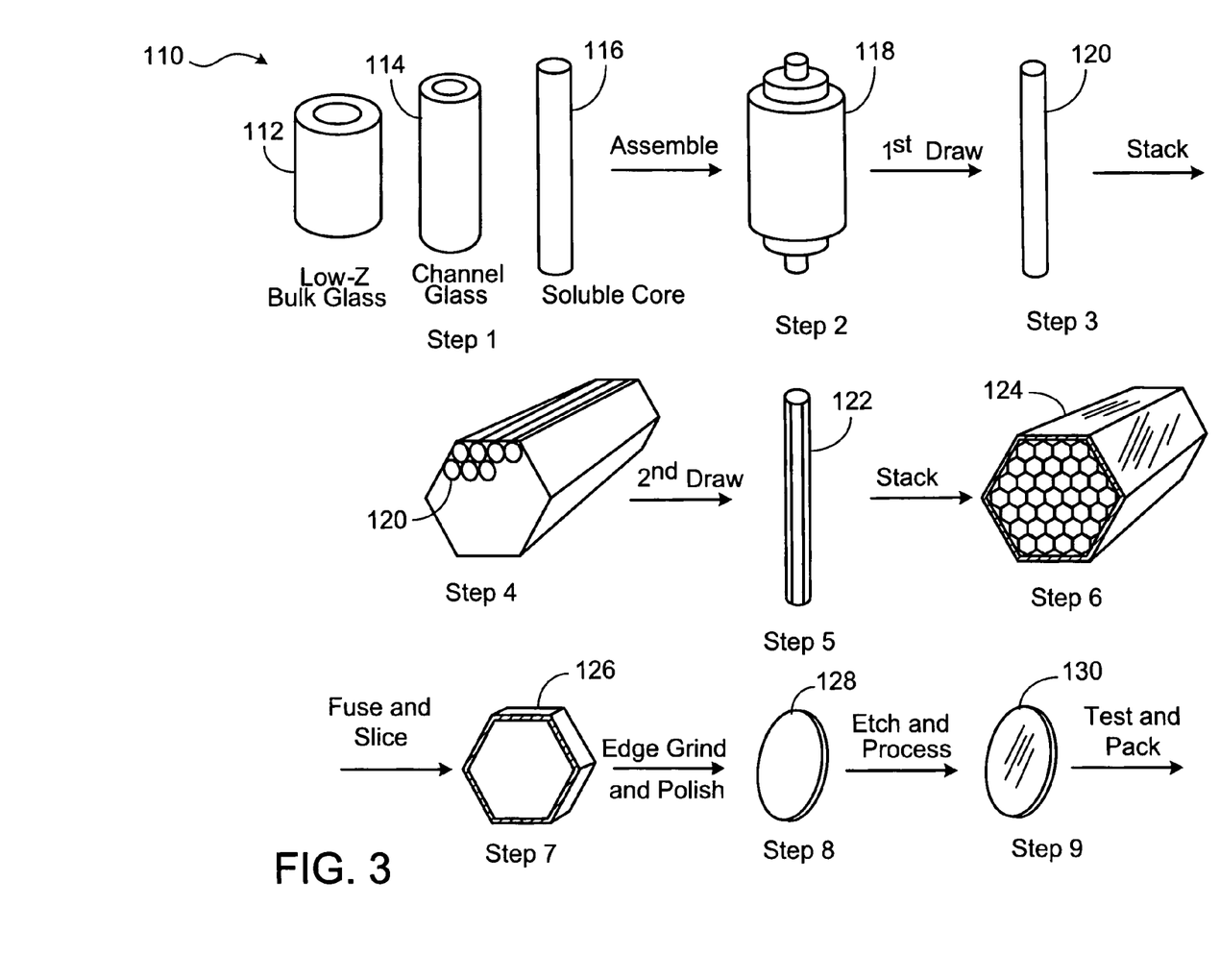
FIG. 3 is a diagram of a process for fabricating the microchannel plate.

FIG. 3 is a diagram of a process 110 for fabricating the microchannel plate 100.

Step 1: Low-Z bulk glass that includes a high percentage of boron-10 (e.g., having at least 1 mol % of boron-10) and a low percentage of lead (e.g., having less than 1 mol %) is melted and cast into right cylinders and reworked into a bulk glass tube 112 by high-temperature extrusion through a set of dies. Here, low-Z glass refers to glass that has a low percentage (e.g., less than 1 mol %) of materials having atomic numbers larger than 34. Similarly, channel glass that includes a high percentage of lead is melted, cast, and reworked into a channel glass tube 114.

The bulk glass tube 112 may have a wall thickness that is, e.g., 5 times the wall thickness of the channel glass tube 114. Soluble core glass is made into a rod 116 having a diameter of, e.g., 1 inch. The inner diameter of the channel glass tube 114 is slightly larger than the diameter of the core glass rod 116, and the inner diameter of the bulk glass tube 112 is slightly larger than the outer diameter of the channel glass 114.

Steps 2 and 3: The core glass rod 116 is inserted into the channel glass tube 114, which is inserted into the low-Z bulk glass tube 114. A combination 118 of the rod 116 and glasses 112, 114 is heated and drawn into a pencil sized rod 120 (e.g., the combination 118 is pulled to become longer and have a smaller diameter).

Steps 4 and 5: A series of drawn rods 120 are bundled, heated, and drawn into a fiber 122 such that the initial 1-inch diameter core rod 116 is reduced to 5 μm in diameter.

Step 6: The drawn fibers 122 are assembled in a hexagonal preform 124 and fused together forming a solid glass billet.

Step 7: The billet is sliced into thin wafers 126 at a 0.5-1° bias (for accurate neutron event localization and minimal parallax blurring).

Step 8: The faces of the thin wafer 126 are polished, and the edges of the wafer 126 are ground into a round shape to produce a solid microchannel plate blank 128.

Step 9: The solid microchannel plate blank 128 is immersed into a dilute acid to etch away the core glass 116, leaving millions of small holes in the range of about 5 to 10 μm in diameter. For example, a microchannel plate blank 128 having a diameter of 1 inch may have about 3 to 5 million microchannels. The etched microchannel plate 130 is subjected to hydrogen at elevated temperatures to develop a semiconducting surface used for electron multiplication. The faces of the microchannel plate 130 are coated with nichrome to serve as the electrodes for application of a voltage to generate electric fields in the microchannels. This completes the processing of the microchannel plate 100, which is ready for testing and packaging.

Figure 4:
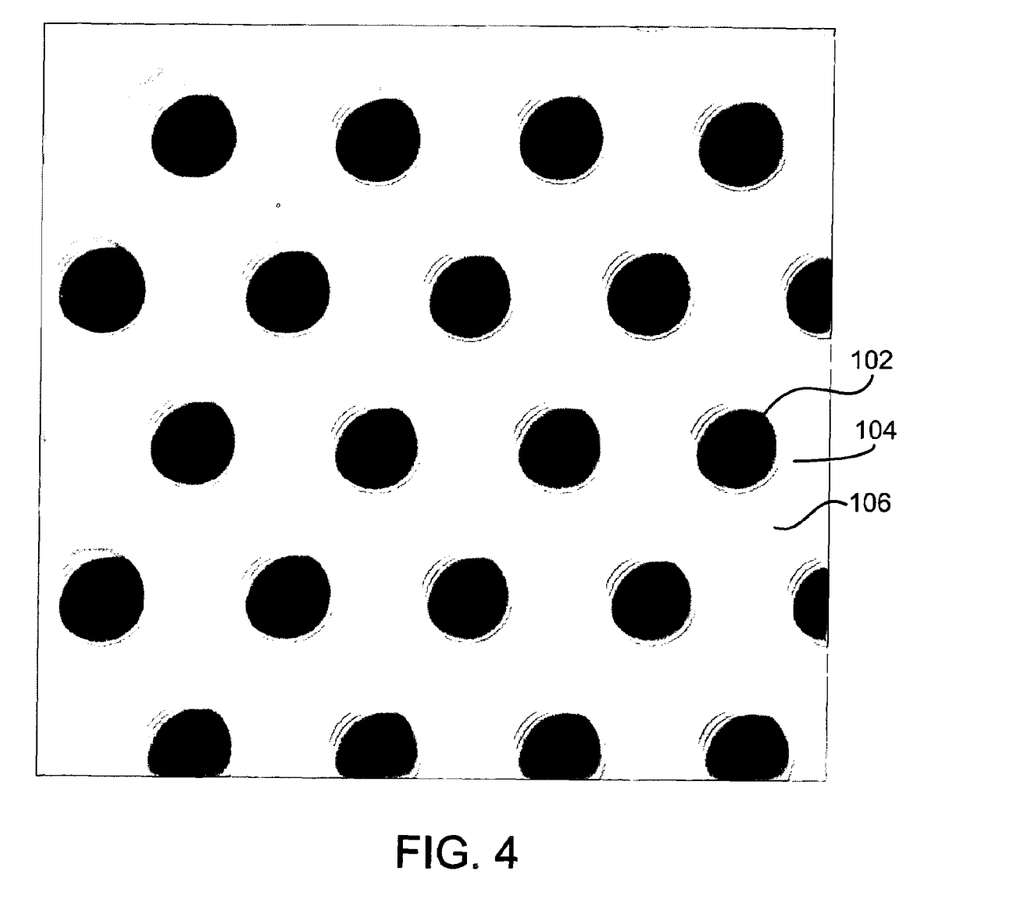
FIG. 4 is a photograph of the microchannel plate.

FIG. 4 is a photograph of the microchannel plate 100 that has the microchannels 102 each surrounded by the inner cladding 104, which in turn is surrounded by the outer cladding 106. The inner claddings 104 have high lead content, while the outer cladding 106 has high boron-10 and low lead content.

In the microchannel plate 100, the boron-10 atoms in the outer cladding 106 capture neutrons in reactions that generate alpha and lithium-7 particles that cause cascades of secondary electrons in the microchannels, resulting in a detectable signal. A detector for detecting electrons output from the microchannels can include, e.g., a metal plate or a phosphor screen coupled to an image sensor.

In some examples, layers of fibers in which each fiber has an outer layer doped with boron-10 and lead and processed to have semiconductive and electron emissive properties can also be used to detect neutrons. The following describes an example of a neutron detector that includes an oriented microfiber plate having fibers with boron-10 and lead enriched claddings.

The following describes an example of a neutron detector that includes layers of fibers.

Figure 5:
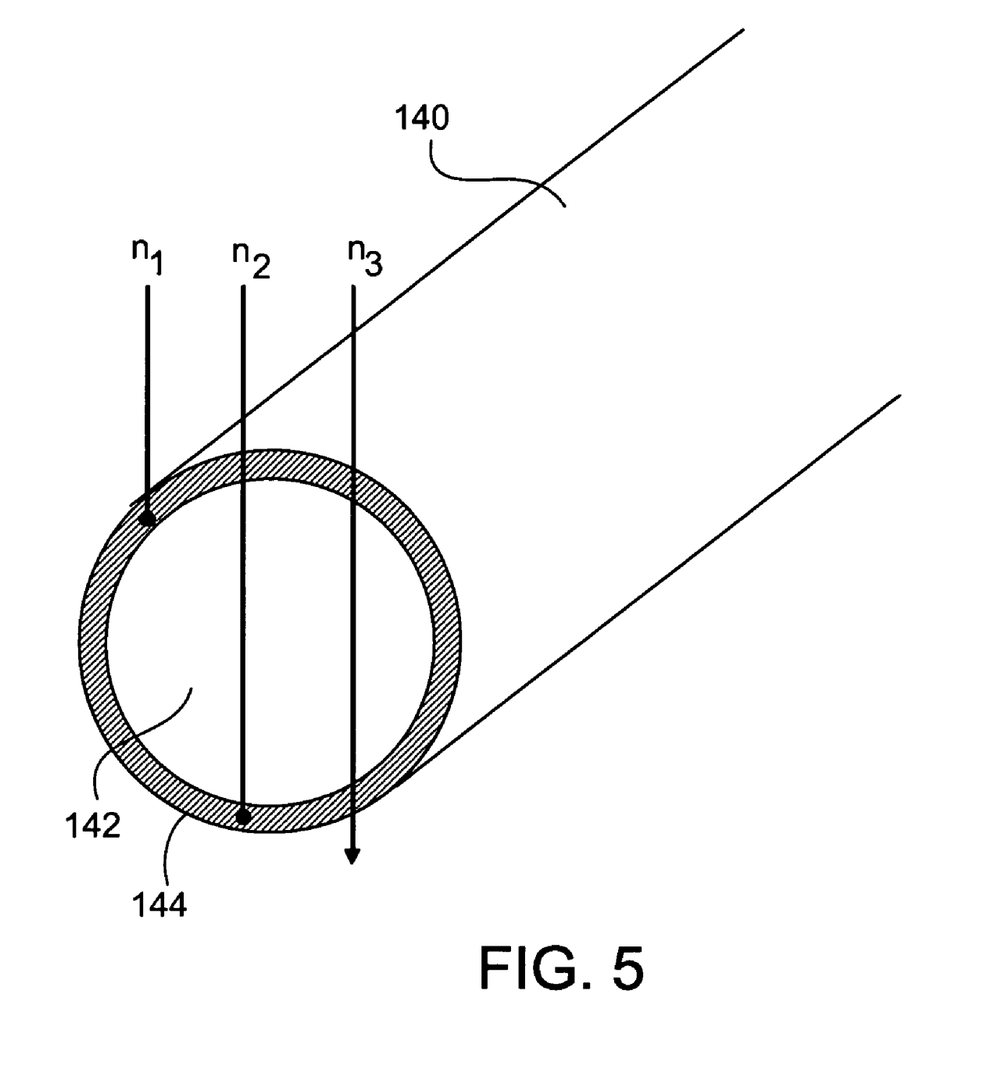
FIG. 5 is a diagram of a fiber that has a core and a cladding glass.

FIG. 5 is a diagram of an example of a fiber 140 that has a core 142 having low boron-10 and low lead content (e.g., having less than 0.1 mol % boron-10 and less than 0.01 mol % lead), and a cladding glass 144 having high boron-10 and high lead content (e.g., having at least 1 mol % of boron-10 and at least 10 mol % of lead). Multiple layers of fibers 140 can be laminated to generate an oriented microfiber plate 150 (see FIGS. 6-8). The boron-10 atoms in the cladding glass 144 can capture neutrons and generate lithium-7 and alpha particles. The cladding glass 144 has a thickness of, e.g., about 3 microns, which is sufficiently thin so that there is a high likelihood that some of the lithium-7 and alpha particles will escape from the fiber 140.

The core 142 has low boron-10 content so that neutrons are not captured in the core 142. When a neutron is captured in the core 142, the lithium-7 and alpha particles may be absorbed within the fiber 140 so that a signal is lost and the neutron is not detected. The core 142 has low lead content so that gamma rays do not interact with lead to generate photoelectrons that may cause false detection of neutrons.

Consider the neutrons n1, n2, and n3 shown in FIG. 5. Neutron n1 is captured by boron-10 in the upper portion of the cladding 144, generating lithium-7 and alpha particles (emitted in opposite directions to conserve momentum) that can escape from the fiber 140. Neutron n2 passes unperturbed through the upper portion of the cladding 144 and the core 142, but interacts with boron-10 in the lower portion of the cladding 144, generating lithium-7 and alpha particles that can escape from the fiber 140. Neutron n3 passes unperturbed through the entire fiber 140, and may interact with another fiber positioned below the fiber 140.

Figure 6:
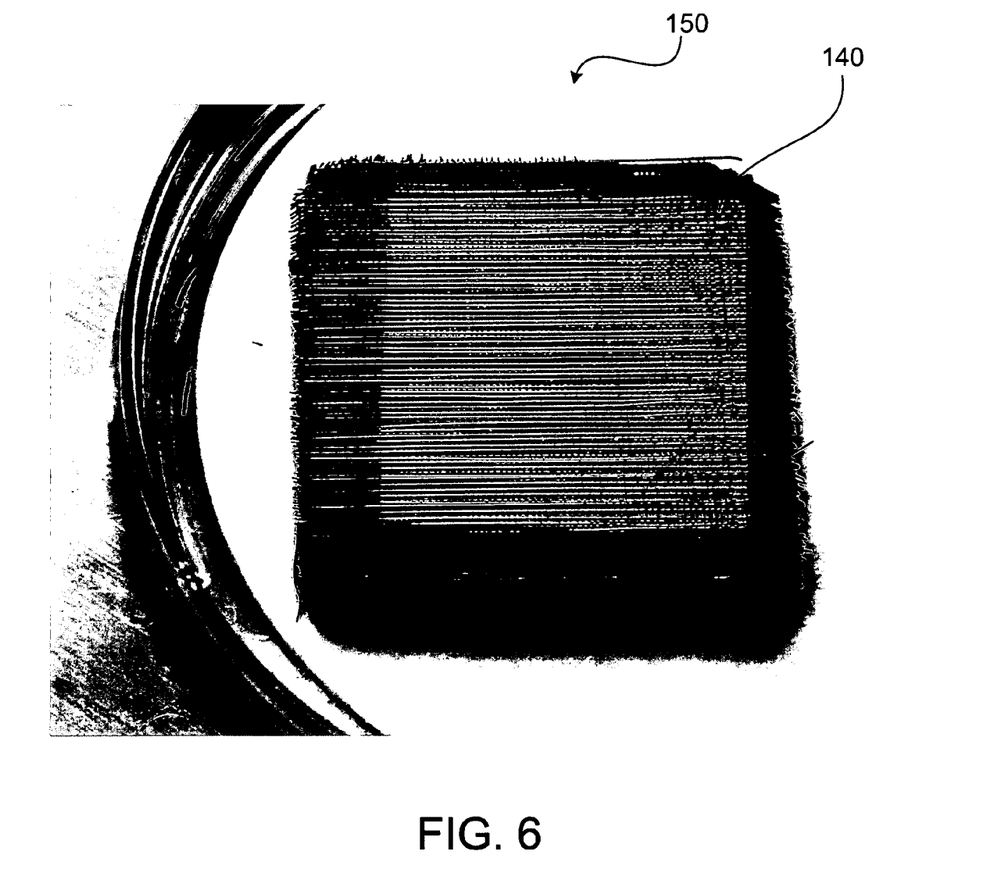
FIG. 6 is a photo of an oriented microfiber plate made of layers of fibers.
Figure 7:
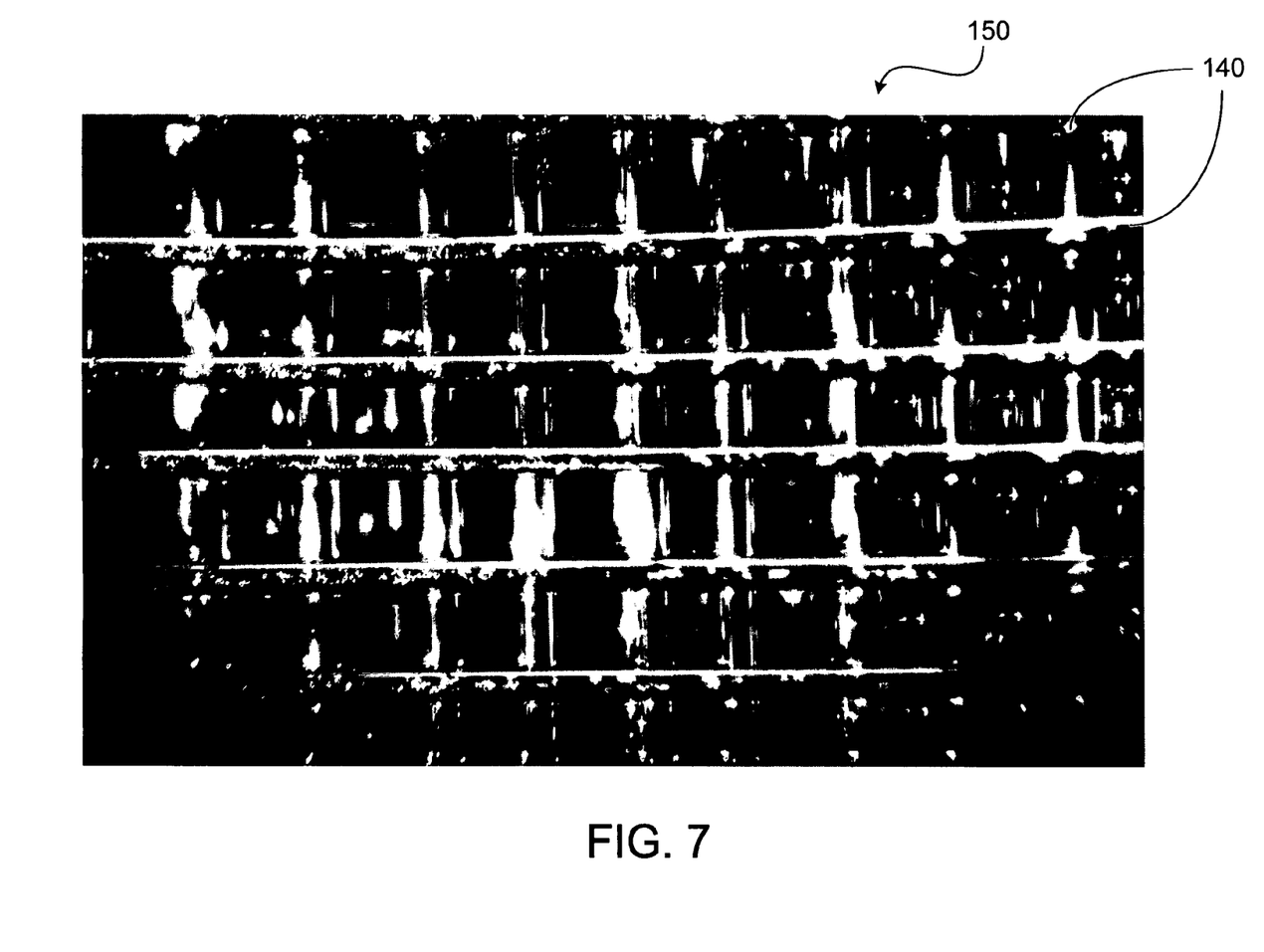
FIGS. 7 and 8 are a top view and a side view, respectively, of the microfiber plate.
Figure 8:
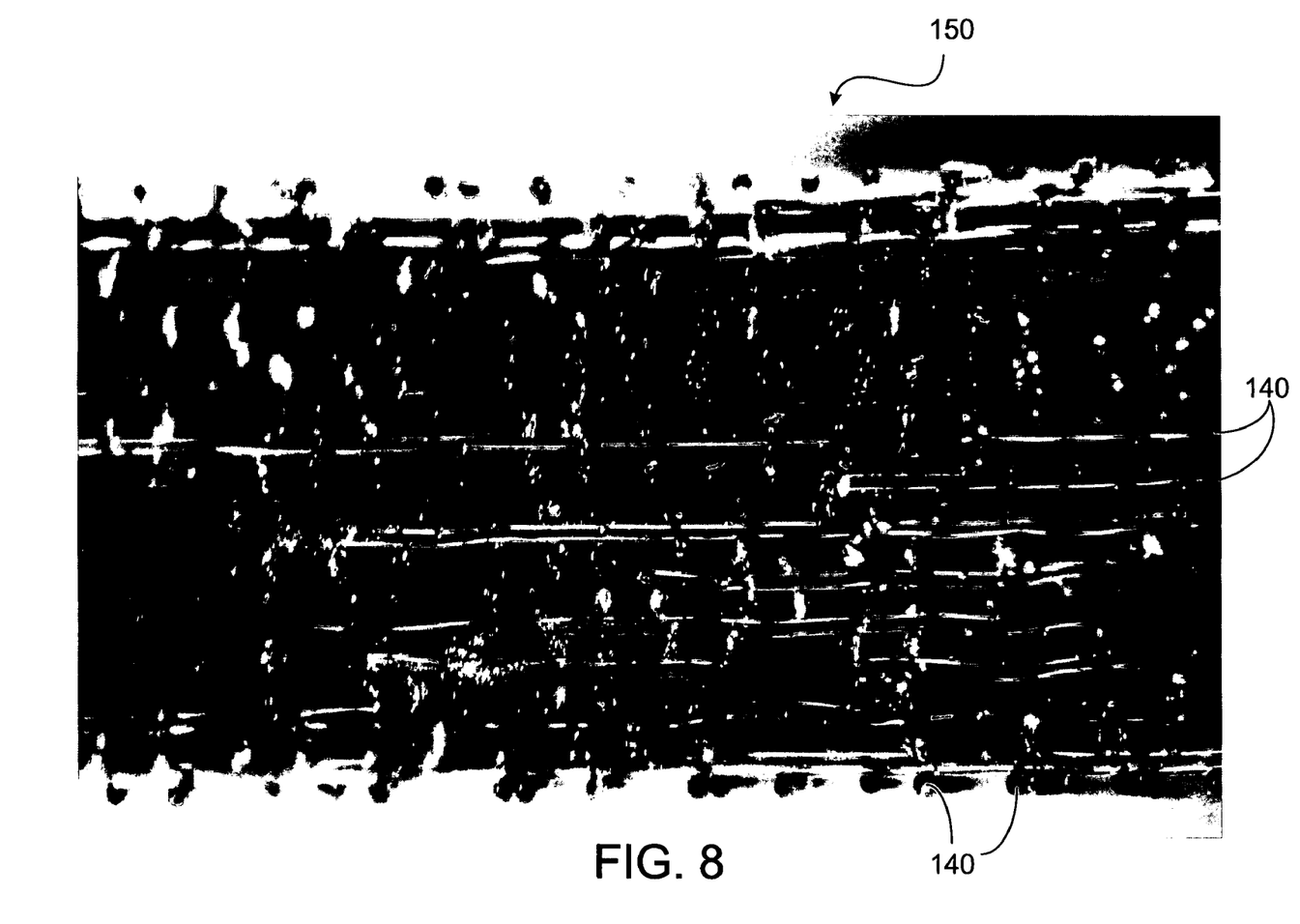

FIG. 6 is a photo of an oriented microfiber plate 150 made of layers of fibers 140. FIGS. 7 and 8 are a top view and a side view, respectively, of the microfiber plate 150, showing the fibers 140 of successive layers alternating in different directions.

The following describes a process for fabricating the microfiber plate 150. A glass rod with low boron-10 content is inserted into a tube composed of a reducible lead glass composition and doped with boron-10. The boron-10 enriched glass has high lead content. The combination of the glass rod and the glass tube is drawn into a fiber 140. The dimensions of the glass rod and the glass tube are designed such that the fiber 140 has a diameter of about 85 microns, and the cladding 142 has a thickness of about 3 microns after the drawing process is completed.

The fibers 140 are wound onto a drum and separated by, e.g., two or three diameters on average (e.g., 170-260 microns). The fibers are aligned and fixed in place with a collodion binder, which is burned off at a later processing stage. The fibers 140 are removed from the drum and cut into, e.g., square sheets of fibers 140. About 30 to 50 layers (sheets) of fibers 140 are stacked on top of one another, with the fibers 140 of each layer rotated 90 degrees with respect to the subsequent layer.

The stack of fibers 140 are fused at a high temperature in an oven, such that the contact points of the individual fibers are slightly fused together. This produces uniform and close contact between adjacent layers. The previously loose stack becomes an integral and robust unit having a thickness of, e.g., about 2 to 3 mm. The fused stack is themochemically treated in a high temperature hydrogen reduction process to produce a layer having semiconductive and electron emissive properties in the claddings 144 of the fibers 140.

A layer of nichrome having a thickness of about 2000 angstroms is coated on each of the top and bottom faces of the microfiber plate 150. The nichrome layers serve as electrodes that allow high bias voltages to be applied to the microfiber plate 150. The surface of each fiber 140 functions as an electron multiplying surface that has a superficial (e.g., about 100 to 200 angstrom) vitreous silica layer that generates a high secondary electron emission. An underlying semiconducting layer allows a bias current to flow for recharge of the electron emitting surface.

In operation, the microfiber plate 150 is placed in a vacuum chamber that has a window for admitting neutrons. The neutrons enter the microfiber plate 150 from above, penetrate the fibers 140 and causing secondary electrons to be generated at the surfaces of the fibers 140 after the neutrons are absorbed at the claddings 144. A bias voltage is applied to the microfiber plate 150 to set up a high electric field of, e.g., about 1 kV/mm within the fiber structure. The high electric field accelerates the secondary electrons into an exponentially increasing avalanche, similar to the gain process inside a photomultiplier tube. The secondary electrons propagate downwards through the microfiber plate 150. A high gain fast electron pulse (e.g., about 1 nanosecond pulse width) is produced and can be detected at the bottom surface of the microfiber plate 150.

The window is made of ultraviolet (UV) light blocking material so that UV photons do not reach the microfiber plate 150. The vacuum chamber also shields the microfiber plate 150 from other types of radiation, such as stray electrons or ions, to prevent noise.

It is to be understood that the foregoing description is intended to illustrate and not to limit the scope of the neutron detection devices described herein. Other embodiments are within the scope of the following claims. For example, the dimensions of the microchannels 102, inner claddings 104, outer cladding 106, claddings 144, and fibers 140 can be different from those described above. Boron-10 may exist in oxide form or in other form. The outer cladding 106 associated with different microchannels can be partially fused together, or can have distinct boundaries between the claddings 106. The core 142 of the fiber 140 in FIG. 5 can have a high boron-11 content. Boron-11 does not capture neutrons and will not interfere with the passage of neutrons through the core 142. The glass of the outer cladding 106 of the microchannel plate 100, instead of being doped with boron-10, can be doped with lithium-6 or gadolinium, which can capture neutron as shown in the following reactions:

$$^6Li + ^1n \rightarrow ^3H + ^4He + Q(4.78 \text{ MeV});$$

$$n + ^{155}Gd \rightarrow ^{156}Gd + \text{gamma rays} + \text{beta particles} + Q(7.9 \text{ MeV});$$

and $$n + ^{157}Gd \rightarrow ^{158}Gd + \text{gamma rays} + \text{beta particles} + Q(8.5 \text{ MeV}).$$

In the case of lithium-6, the neutron capture reaction generates alpha particles (helium-4 ions) that can cause secondary electron emissions in the microchannels 102. In the case of gadolinium, the neutron capture reaction generates beta particles (energetic electrons) that can cause secondary electron emissions in the microchannels 102. The glass of the outer cladding 106 can also be doped with a combination of two or more of boron-10, lithium-6, and gadolinium. Similarly, the glass cladding 144 of the fiber 140 can be doped with lithium-6 or gadolinium instead of boron-10, or a combination of two or more of boron-10, lithium-6, and gadolinium.

Elements of different embodiments described above may be combined to form embodiments not specifically described herein. Other implementations not specifically described herein are also within the scope of the following claims.

What is claimed is:

1. A method comprising:
    fabricating a channel plate using a plurality of fibers each including a soluble core, a first layer of glass cladding surrounding the soluble core, and a second layer of glass cladding surrounding the first layer of glass cladding, the first layer of glass cladding containing a higher percentage of lead than the second layer of glass cladding, the second layer of cladding containing a higher percentage of at least one of boron-10, lithium-6, and gadolinium than the first layer of glass cladding; and
    removing the soluble core to form channels.

2. The method of claim 1, wherein the second layer of glass cladding has less than 1 mol % of lead.

3. The method of claim 1, wherein fabricating the channel plate comprises drawing the fibers to reduce the cross sectional areas of the fibers.

4. The method of claim 1, wherein each of at least some of the channels has a diameter less than 150 microns.

5. The method of claim 1, further comprising exposing the first layer of glass cladding to hydrogen at a high temperature.

6. A method comprising:
    fabricating a microchannel plate using a plurality of fibers each including a soluble core, a first layer of cladding surrounding the soluble core, and a second layer of cladding surrounding the first layer of cladding, the first layer of cladding having a higher percentage of material having atomic numbers greater than 34 as compared to the second layer of cladding, the second layer of cladding having a higher percentage of neutron absorbing material than the first layer of cladding; and
    removing the soluble core to form microchannels.

7. The method of claim 6, wherein fabricating the channel plate comprises drawing the fibers to reduce the cross sectional areas of the fibers.

8. The method of claim 6, wherein each of at least some of the channels has a diameter less than 150 microns.

9. The method of claim 6, wherein the second layer of cladding comprises glass having less than 1 mol % of lead.

10. The method of claim 6, wherein the neutron absorbing material comprises at least one of boron-10, lithium-6, and gadolinium.

11. A method comprising:
applying a bias voltage to a microchannel plate comprising a structure that defines a plurality of microchannels, the structure including a plurality of claddings that form the walls of the microchannels, the claddings having a semiconducting layer, the claddings being surrounded by a glass having a lower percentage of lead than the claddings, the glass having a higher percentage of neutron absorbing material than the cladding;
capturing neutrons in the glass and generating secondary electron emissions in the microchannels; and
detecting the secondary electron emissions.

12. The method of claim 11, wherein the neutron absorbing material comprises at least one of boron-10, lithium-6, and gadolinium.

13. The method of claim 11, further comprising generating an image of an object based on detection of neutrons by the microchannel plate.

14. The method of claim 11, further comprising detecting a nuclear material based on detection of neutrons by the microchannel plate.

15. A method comprising:
laminating layers of fibers, each fiber including a core surrounded by a cladding, the cladding having a higher percentage of at least one of boron-10, lithium-6, and gadolinium than the core;
coating a first conducting layer on a first surface of the laminated layers of fiber; and
coating a second conducting layer on a second surface of the laminated layers of fiber.

16. The method of claim 15, wherein the core of at least some of the fibers has less than 0.1 mol % of boron-10, lithium-6, and gadolinium.

17. The method of claim 15, wherein laminating layers of fibers comprises orienting a first layer of fibers substantially parallel to a first direction and orienting a second layer of fibers substantially parallel to a second direction, the first direction being at an angle to the second direction.

18. A method comprising:
applying a bias voltage to a laminate comprising layers of fibers, each fiber including a core surrounded by a cladding, the cladding having a higher percentage of at least one of boron-10, lithium-6, and gadolinium as compared to the core;
capturing neutrons using the boron-10, lithium-6, or gadolinium in the cladding and generating secondary electron emissions; and
detecting the secondary electron emissions.

19. An apparatus comprising:
a microchannel plate comprising a structure that defines a plurality of microchannels, the structure including a plurality of claddings that form the walls of the microchannels, each of the claddings comprising a semiconducting layer, the claddings being surrounded by a glass, the glass having a lower percentage of material having atomic numbers higher than 34 as compared to the claddings, the glass having a higher percentage of neutron absorbing material than the cladding, the neutron absorbing material capable of capturing neutrons in reactions that result in secondary electron emissions in the microchannels.

20. The apparatus of claim 19, wherein the claddings comprise at least 10 mol % of lead.

21. The apparatus of claim 19, wherein each of at least some of the microchannels has a diameter less than 150 microns.

22. The apparatus of claim 19, wherein each of at least some of the microchannels has a length that is at least 10 times the diameter of the microchannel.

23. The apparatus of claim 19, wherein each of at least some of the microchannels has at least one of a circular, a square, a rectangular, and a hexagonal cross section.

24. The apparatus of claim 19, further comprising a shield to reduce the amount of gamma rays reaching the microchannel plate.

25. The apparatus of claim 19, further comprising an image sensor to detect the secondary electron emissions.

26. The apparatus of claim 19, further comprising a counter to count the number of detected neutrons.

27. An apparatus comprising:
a microchannel plate comprising a structure that defines a plurality of microchannels, the structure including inner claddings each forming the wall of one of the microchannels, each inner cladding being surrounded by an outer cladding comprising a lower percentage of lead than the inner cladding, the outer cladding having a higher percentage of at least one of boron-10, lithium-6, and gadolinium than the inner cladding.

28. The apparatus of claim 27, wherein the inner cladding comprise at least 10 mol % of lead.

29. The apparatus of claim 27, wherein the outer cladding comprise at least 1 mol % of at least one of boron-10, lithium-6, and gadolinium.

30. The apparatus of claim 27, wherein some of the outer claddings associated with different microchannels are fused together into a continuous piece of material.

31. An apparatus comprising:
a laminate comprising layers of fibers, each fiber including a core surrounded by a cladding, the cladding having a higher percentage of at least one of boron-10, lithium-6, and gadolinium as compared to the core;
a first conducting layer coated on a first surface of the laminate; and
a second conducting layer coated on a second surface of the laminate.

32. The apparatus of claim 31, wherein the core of each of at least some of the fibers comprises a glass that has less than 0.1 mol % of boron-10, lithium-6, and gadolinium.

33. The apparatus of claim 31, wherein the cladding of each of at least some of the fibers comprises a glass that has more than 1 mol % of at least one of boron-10, lithium-6, and gadolinium.

34. The apparatus of claim 31, wherein the cladding in each of at least some of the fibers has a thickness in a range between 1 to 10 microns.

35. The apparatus of claim 31, wherein the cladding in each of at least some of the fibers has a thickness in a range between 2 to 5 microns.

36. The apparatus of claim 31, wherein the laminate comprises a first layer of fibers that are parallel to a first direction and a second layer of fibers that are parallel to a second direction, the first direction being at an angle to the second direction.

37. The apparatus of claim 31, wherein in each layer of fiber, the fibers are spaced apart by distances in a range between 100 to 300 microns.

* * * * *

UNITED STATES PATENT AND TRADEMARK OFFICE
CERTIFICATE OF CORRECTION

| | | |
|---|---|---|
| PATENT NO. | : 7,333,701 B1 | Page 1 of 1 |
| APPLICATION NO. | : 11/522855 | |
| DATED | : February 19, 2008 | |
| INVENTOR(S) | : W. Bruce Feller et al. | |

It is certified that error appears in the above-identified patent and that said Letters Patent is hereby corrected as shown below:

In the specification,

Col. 1, after line 3, please include the following paragraph:

-- STATEMENT REGARDING FEDERALLY SPONSORED RESEARCH OR DEVELOPMENT

This invention was made with government support under Defense Threat Reduction Agency contract HDTRA1-05-C-0023. The government has certain rights in the invention. --

Signed and Sealed this
Twenty-sixth Day of April, 2016

Michelle K. Lee
*Director of the United States Patent and Trademark Office*